(12) United States Patent
Tomes

(10) Patent No.: US 12,473,840 B2
(45) Date of Patent: Nov. 18, 2025

(54) CONTAINMENT RING FOR GAS TURBINE ENGINE

(71) Applicant: Pratt & Whitney Canada Corp., Longueuil (CA)

(72) Inventor: Nathan Tomes, Hamilton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/661,372

(22) Filed: May 10, 2024

(65) Prior Publication Data

US 2025/0347230 A1    Nov. 13, 2025

(51) Int. Cl.
| | |
|---|---|
| *F01D 21/04* | (2006.01) |
| *F01D 5/28* | (2006.01) |
| *F01D 25/24* | (2006.01) |

(52) U.S. Cl.
CPC ............ *F01D 21/045* (2013.01); *F01D 5/282* (2013.01); *F01D 25/24* (2013.01); *F01D 25/243* (2013.01); *F05D 2240/14* (2013.01); *F05D 2250/283* (2013.01); *F05D 2300/603* (2013.01); *F05D 2300/6034* (2013.01); *F05D 2300/612* (2013.01)

(58) Field of Classification Search
CPC ........ F01D 21/045; F01D 21/04; F01D 25/24; F01D 25/243
See application file for complete search history.

(56) References Cited

U.S. PATENT DOCUMENTS

| | | | |
|---|---|---|---|
| 4,071,647 | A | 1/1978 | McMullen |
| 4,490,092 | A | 12/1984 | Premont |

(Continued)

FOREIGN PATENT DOCUMENTS

| | | |
|---|---|---|
| FR | 2663412 A1 | 12/1991 |
| GB | 2442112 A | 3/2008 |

OTHER PUBLICATIONS

Extended European Search Report for EP Application No. 25175657.3; Issue date, Sep. 24, 2025, 10 pages.

*Primary Examiner* — Courtney D Heinle
*Assistant Examiner* — Behnoush Haghighian
(74) *Attorney, Agent, or Firm* — CANTOR COLBURN LLP

(57) ABSTRACT

A casing for a gas turbine engine, including: an inner ring portion; an intermediate layer of honeycomb and/or foam secured to a radially outward surface of the inner ring portion; an outer ring portion secured to a radially outward surface of the layer of honeycomb and/or foam; and a composite containment belt secured to a radially outward surface of the outer ring portion, the composite containment belt having a central portion integrally formed with a forward ring portion and an aft ring portion, the composite containment belt including at least one single woven belt wound about the outer ring portion, the at least one single woven belt including a plurality of continuous fibers, wherein a first portion of the plurality of continuous fibers are at arranged at an angle of 45/−45 degrees or greater with respect to a circumferential direction of the composite containment belt in the central portion and a second portion of the plurality of continuous fibers are at arranged at an angle of less than 45/−45 degrees with respect to the circumferential direction of the composite containment belt in the forward ring portion and the aft ring portion.

20 Claims, 12 Drawing Sheets

(56) References Cited

U.S. PATENT DOCUMENTS

| | | | |
|---|---|---|---|
| 4,961,685 A | 10/1990 | Neubert | |
| 5,437,538 A | 8/1995 | Mitchell | |
| 6,652,222 B1 | 11/2003 | Wojtyczka et al. | |
| 8,757,958 B2 * | 6/2014 | Lussier | F01D 21/045 |
| | | | 415/197 |
| 9,032,706 B2 * | 5/2015 | Marshall | F01D 21/045 |
| | | | 415/214.1 |
| 10,443,617 B2 * | 10/2019 | Finnigan | B29C 70/24 |
| 10,655,500 B2 * | 5/2020 | Heeter | B32B 5/02 |
| 10,995,634 B2 * | 5/2021 | Zaccardi | F01D 25/24 |
| 11,156,126 B2 * | 10/2021 | Kling | B29D 99/006 |
| 11,491,743 B2 * | 11/2022 | Le Hong | B29C 70/24 |
| 11,499,448 B2 | 11/2022 | Yadav et al. | |
| 11,879,351 B2 * | 1/2024 | Kim | F01D 25/246 |
| 11,891,910 B2 * | 2/2024 | Bourolleau | F01D 25/24 |
| 2011/0052383 A1 * | 3/2011 | Lussier | F01D 21/045 |
| | | | 156/190 |
| 2019/0160765 A1 * | 5/2019 | Le Hong | B29C 70/462 |
| 2020/0025034 A1 * | 1/2020 | Kling | F01D 25/24 |
| 2021/0102475 A1 | 4/2021 | Crall et al. | |
| 2023/0184136 A1 * | 6/2023 | Kim | F01D 25/04 |
| | | | 415/213.1 |

* cited by examiner

CONTAINMENT RING FOR GAS TURBINE ENGINE

BACKGROUND

This disclosure relates to gas turbine engines, and more particularly to a containment ring for a gas turbine engine.

Gas turbine engines include rotating blades. In the event of a failure of any of the rotating blades it is desirable to contain the dislodged blade within the engine.

As such, it is desirable to provide an apparatus and method for blade containment in a gas turbine engine.

BRIEF DESCRIPTION

Disclosed is a casing for a gas turbine engine, including: an inner ring portion; an intermediate layer of honeycomb and/or foam secured to a radially outward surface of the inner ring portion; an outer ring portion secured to a radially outward surface of the layer of honeycomb and/or foam; and a composite containment belt secured to a radially outward surface of the outer ring portion, the composite containment belt having a central portion integrally formed with a forward ring portion and an aft ring portion, the composite containment belt formed from at least one single woven belt wound about the outer ring portion, the at least one single woven belt including a plurality of continuous fibers, wherein a first portion of the plurality of continuous fibers are at arranged at an angle of 45/−45 degrees or greater with respect to a circumferential direction of the composite containment belt in the central portion and a second portion of the plurality of continuous fibers are at arranged at an angle of less than 45/−45 degrees with respect to the circumferential direction of the composite containment belt in the forward ring portion and the aft ring portion.

In addition to one or more of the features described above, or as an alternative to any of the foregoing embodiments, the first portion of the plurality of continuous fibers are at arranged at an angle of 45/−45 degrees with respect to the circumferential direction in the central portion of the composite containment belt and the second portion of plurality of continuous fibers are arranged at an angle of 0 degrees with respect to the circumferential direction in the forward ring portion and the aft ring portion.

In addition to one or more of the features described above, or as an alternative to any of the foregoing embodiments, the second portion of the plurality of continuous fibers are arranged at an angle of 0 degrees with respect to the circumferential direction in the forward ring portion and the aft ring portion.

In addition to one or more of the features described above, or as an alternative to any of the foregoing embodiments, the intermediate layer is a layer of honeycomb and the inner ring portion is formed from a composite material.

In addition to one or more of the features described above, or as an alternative to any of the foregoing embodiments, the intermediate layer is a layer of foam and the inner ring portion is formed from a composite material.

In addition to one or more of the features described above, or as an alternative to any of the foregoing embodiments, the intermediate layer is a layer of honeycomb and foam and the inner ring portion is formed from a composite material and the outer ring portion is formed from anyone of the following; sheet metal formed from one of steel, aluminum, and titanium or a composite material of glass, carbon, or aramid fiber reenforced epoxy and the inner ring portion is formed from anyone of the following sheet metal formed from one of steel, aluminum, and titanium or a composite material of glass, carbon, or aramid fiber reenforced epoxy.

In addition to one or more of the features described above, or as an alternative to any of the foregoing embodiments, a pair of flanges extend radially outward from the inner ring portion.

In addition to one or more of the features described above, or as an alternative to any of the foregoing embodiments, the inner ring portion further comprises a recessed area for receipt of an abradable surface therein.

Also disclosed is a gas turbine engine, including: a fan having a plurality of fan blades; a casing surrounding the plurality of fan blades, the casing including: an inner ring portion; an intermediate layer of honeycomb and/or foam secured to a radially outward surface of the inner ring portion; an outer ring portion secured to a radially outward surface of the intermediate layer of honeycomb and/or foam; and a composite containment belt secured to a radially outward surface of the outer ring portion, the composite containment belt having a central portion integrally formed with a forward ring portion and an aft ring portion, the composite containment belt formed from at least one single woven belt wound about the outer ring portion, the at least one single woven belt including a plurality of continuous fibers, wherein a first portion of the plurality of continuous fibers are at arranged at an angle of 45/−45 degrees or greater with respect to a circumferential direction of the composite containment belt in the central portion and a second portion of the plurality of continuous fibers are at arranged at an angle of less than 45/−45 degrees with respect to the circumferential direction of the composite containment belt in the forward ring portion and the aft ring portion.

In addition to one or more of the features described above, or as an alternative to any of the foregoing embodiments, the first portion of the plurality of continuous fibers are at arranged at an angle of 45/−45 degrees with respect to the circumferential direction in the central portion of the composite containment belt and the second portion of the plurality of continuous fibers are arranged at an angle of 0 degrees with respect to the circumferential direction in the forward ring portion and the aft ring portion.

In addition to one or more of the features described above, or as an alternative to any of the foregoing embodiments, the second portion of the plurality of continuous fibers are arranged at an angle of 0 degrees with respect to the circumferential direction in the forward ring portion and the aft ring portion.

In addition to one or more of the features described above, or as an alternative to any of the foregoing embodiments, the intermediate layer is a layer of honeycomb and the inner ring portion is formed from a composite material.

In addition to one or more of the features described above, or as an alternative to any of the foregoing embodiments, the intermediate layer is a layer of foam and the inner ring portion is formed from a composite material.

In addition to one or more of the features described above, or as an alternative to any of the foregoing embodiments, the intermediate layer is a layer of honeycomb and foam and the outer ring portion is formed from anyone of the following; sheet metal formed from one of steel, aluminum, and titanium or a composite material of glass, carbon, or aramid fiber reenforced epoxy and the inner ring portion is formed from anyone of the following sheet metal formed from one of steel, aluminum, and titanium or a composite material of glass, carbon, or aramid fiber reenforced epoxy.

In addition to one or more of the features described above, or as an alternative to any of the foregoing embodiments, a pair of flanges extend radially outward from the outer ring portion.

In addition to one or more of the features described above, or as an alternative to any of the foregoing embodiments, the inner ring portion further comprises a recessed area for receipt of an abradable surface therein.

In addition to one or more of the features described above, or as an alternative to any of the foregoing embodiments, the composite containment belt is formed from a single overlapping layer of a plurality of continuous fibers.

In addition to one or more of the features described above, or as an alternative to any of the foregoing embodiments, a layer of foam or honeycomb is located between the composite containment belt and the outer ring portion.

In addition to one or more of the features described above, or as an alternative to any of the foregoing embodiments, the intermediate layer is a layer of honeycomb or foam and the inner ring portion is formed from a composite material.

Also disclosed is a casing for a gas turbine engine, including: an inner ring portion; an intermediate layer of honeycomb and/or foam secured to a radially outward surface of the inner ring portion; an outer ring portion secured to a radially outward surface of the layer of honeycomb and/or foam; and a composite containment belt secured to a radially outward surface of the outer ring portion, the composite containment belt being formed from a plurality of 45 degree fabric plies or layers overlaying each other at a central portion of the composite containment belt and wherein unidirectional tape plies are located between the plurality of separate 45 degree fabric plies at a forward ring portion and an aft ring portion each integrally formed with the central portion of the composite containment belt wherein the unidirectional tape plies are not located between the plurality of separate 45 degree fabric plies at the central portion of the composite containment belt.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the FIGS.

Figure 1:
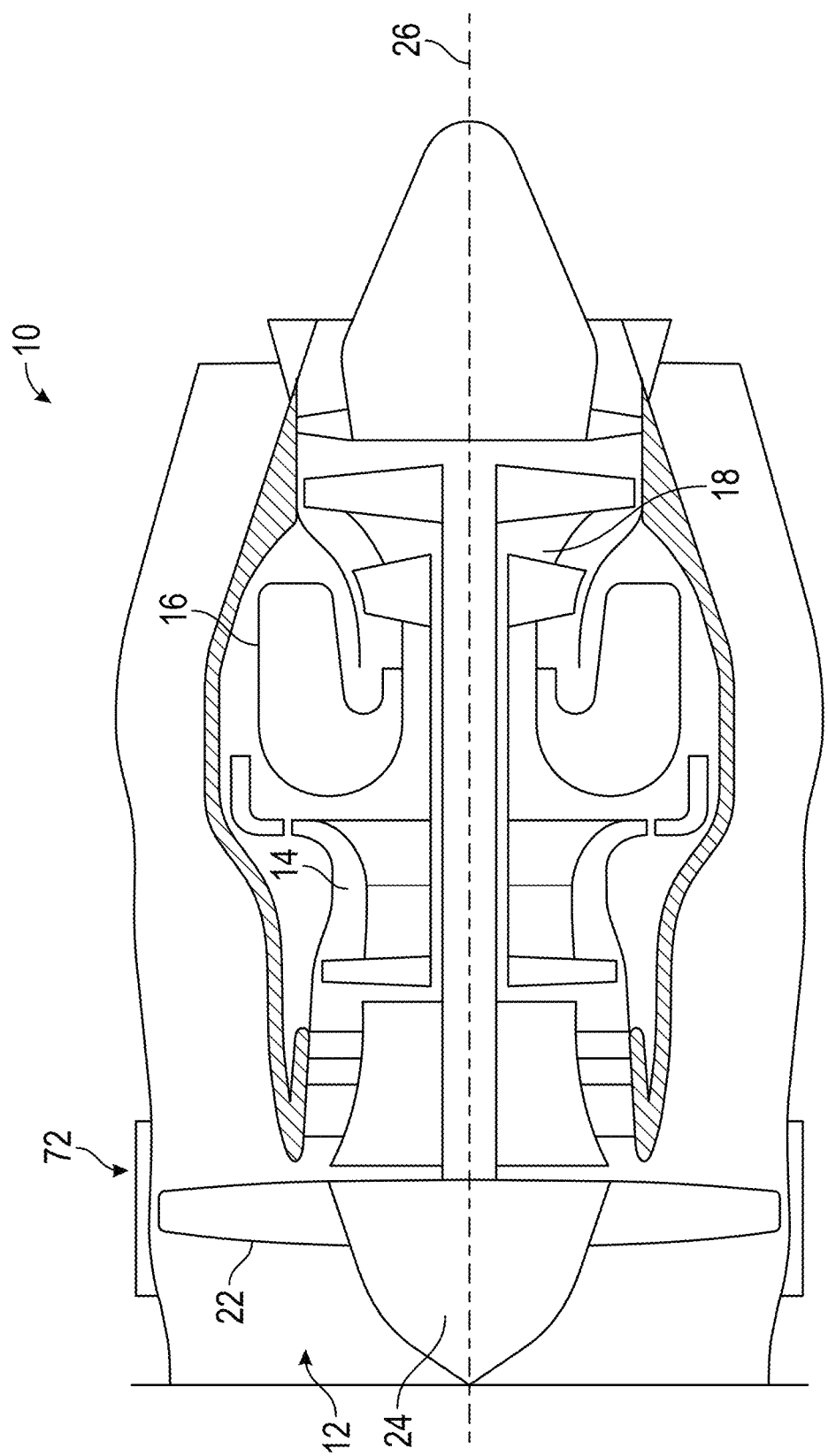
FIG. 1 is a schematic, partial cross-sectional view of a gas turbine engine in accordance with this disclosure.

FIG. 1 illustrates a turbofan gas turbine engine 10 of a type provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases. The fan 12 includes a fan case 72 surrounding a circumferential array of fan blades 22 extending radially outwardly from a rotor 24 mounted for rotation about a central axis 26 of the engine 10.

It should be noted that the terms "radial", "axial" and "circumferential" used throughout the description and the appended claims, are defined with respect to the central axis 26 of the engine 10. The terms "front", "forward" "afore", "aft" and after" used throughout the description and the appended claims are defined with respect to the flow direction of air being propelled through the engine.

In one non-limiting example, the fan 12 includes a plurality of fan blades 22. It is necessary to retain high energy debris resulting from a blade failure of any stage in the gas turbine engine 10 and this debris must be contained within the engine. In the case of a fan blade off, there are at least two dominant methods of achieving the containment of the fan blades 22. These may be referred to as hard wall and soft wall.

Hardwall containment relies upon a single ring of a strong material to contain the fan blade. This ring can be made of metal or composite, it may have ribs for stiffening specific areas, may have variable thickness or radius, and the fan case may include other layers (abradable and/or a blade tip blunting layer for example), but most of the energy is absorbed by the single containment ring. The advantage of hardwall containment is that it achieves containment reliably within a relatively small amount of space and with limited deflection, allowing the nacelle profile to be defined as tight as possible to the gas path to minimize powerplant drag. The disadvantages are that the forces generated in containment are very high, and are concentrated directly at the point of impact with limited redistribution around the ring, and the released blade remains in the gaspath, continuing to interact with the remaining blades, usually fracturing into multiple pieces, and travelling either upstream out the inlet or downstream out the exhaust and possibly interacting with structure along the way. The high, concentrated containment forces are transferred to the inlet, often driving heavier designs for inlet attachment flange and inlet structure. The blade remaining in the gaspath causes higher interaction forces with the following blade, sometimes driving increased blade weight to withstand these forces or in a few cases, causing multiple blades to release. The longer interaction also causes difficulties for trajectory predictions which are an important simulation validation point.

As used herein forward or upstream and rearward or downstream refer are relative to the engine central longitudinal axis 26 and the direction gases flowing through the gas turbine engine 20. In addition, radially inward and radially outward also refer to the engine central longitudinal axis 26.

Soft wall containment relies on a multi-layered belt of dry Kevlar to contain the fan blade. The blade is allowed to pass through the structure of the fan cases (often a lightweight sandwich structure) and hit the Kevlar. The Kevlar belts slip and stretch significantly while absorbing the blade's kinetic energy, causing a large bulge. The longer distance across which the blade travels during containment means that the peak force on the fan case is lower compared to hardwall containment, and the belt effectively redistributes the containment force around the circumference of the case. These effects together usually allow the fan case and adjacent structure to be lighter compared to hardwall containment. In addition, because the released blade exits the gaspath entirely, it only briefly interacts with the remaining fan blades, allowing further weight reduction. While prediction of the released blade trajectory is not trivial in soft wall containment, it is less chaotic than hardwall systems because following containment the blade is trapped between the case structure and the Kevlar belt. The disadvantages of soft wall containment are that the Kevlar bulge is significant, driving the nacelle loft outward, increasing drag. The bulge also causes the need for a keep out zone all around the fan case through which no crucial or hazardous hardware may pass, further complicating the design.

Figure 2:
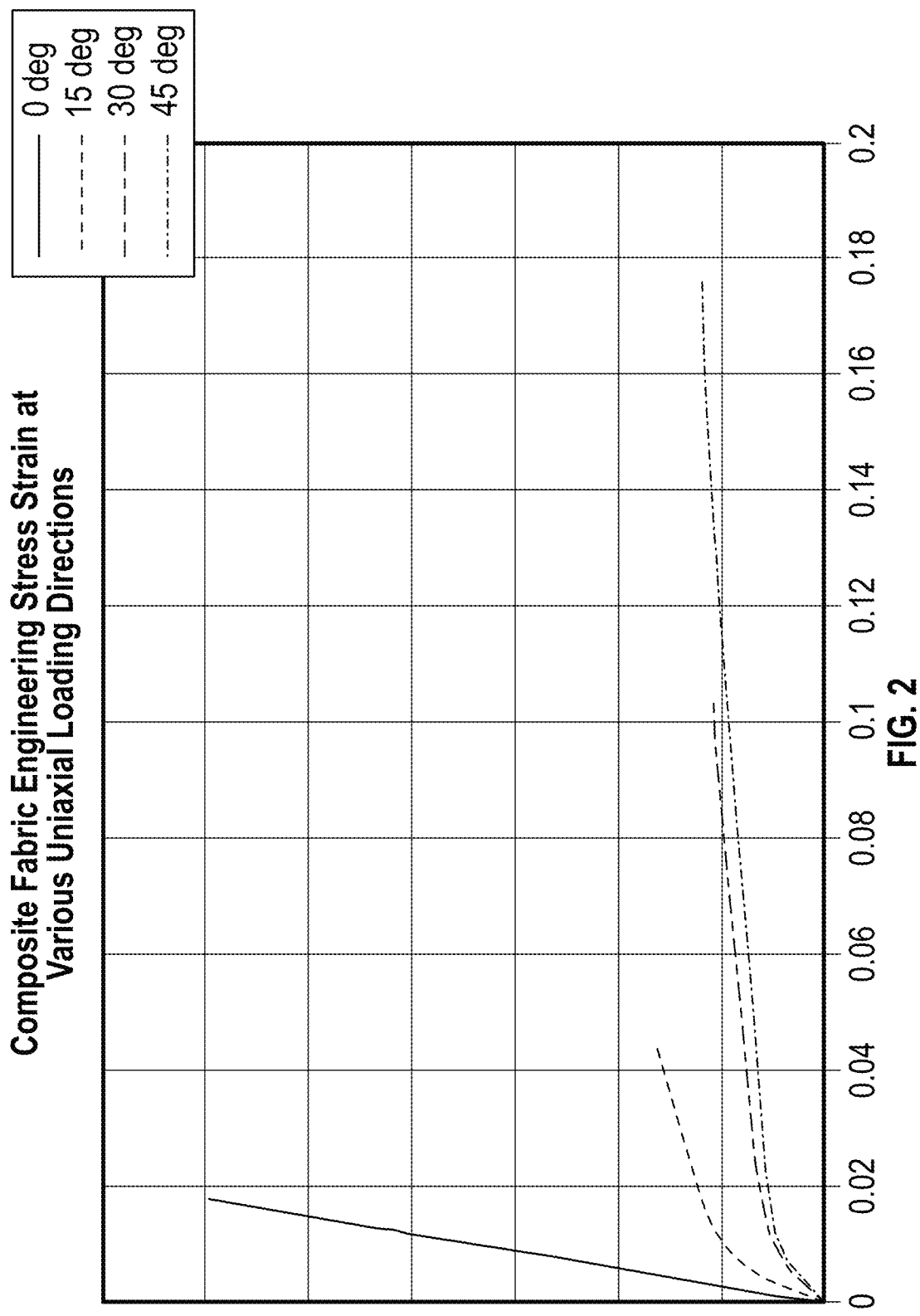
FIG. 2 is a graph illustrating stress strain curved for various uniaxial loading directions in plain weave long fiber composite fabrics.
Figure 3:
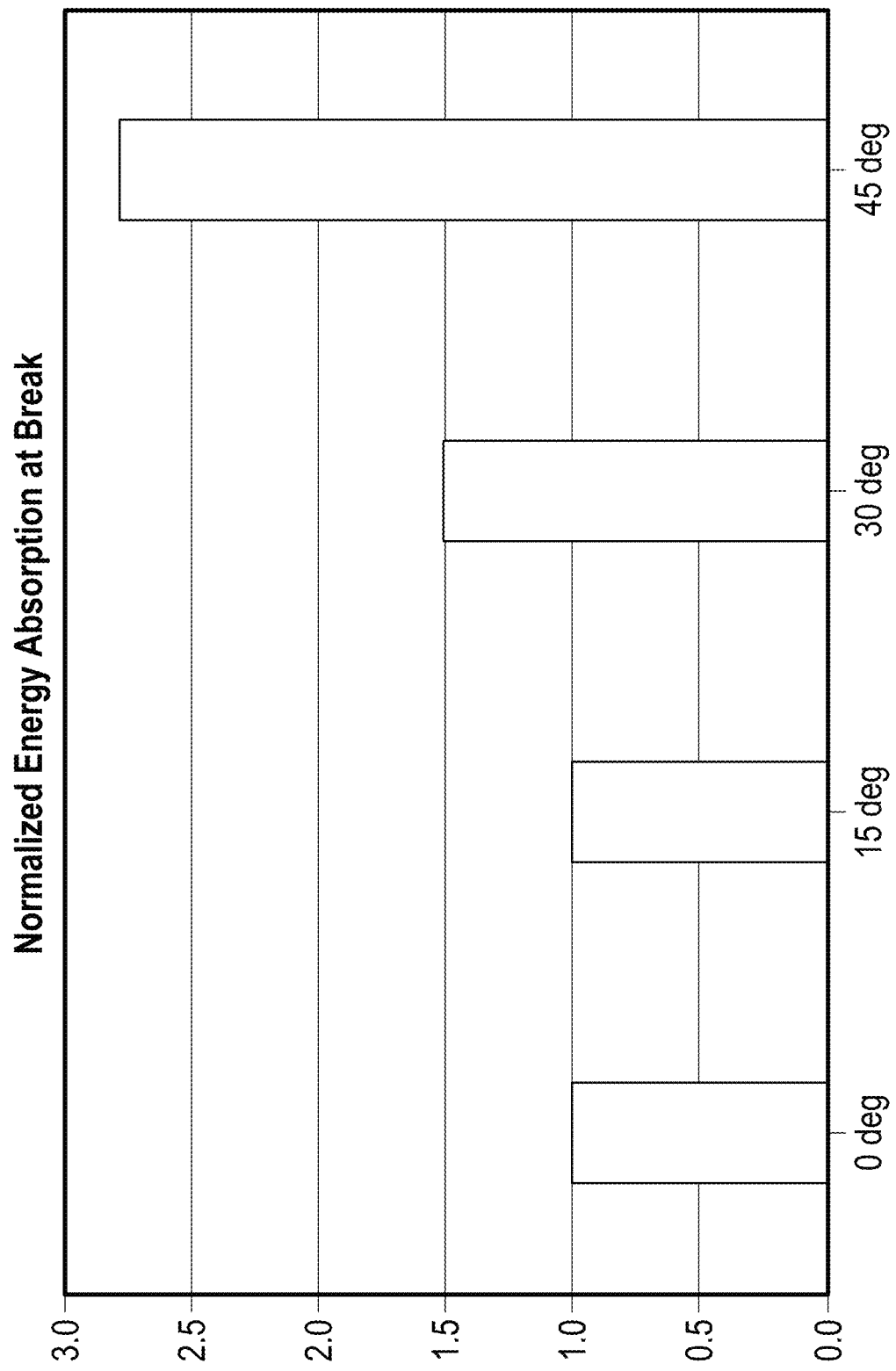
FIG. 3 is a graph illustrating normalized energy absorption in plain weave long fiber composite fabrics at various uniaxial loading angles.

If the hard wall containment design includes long fiber composites (such as continuous carbon fiber fabric, tape, or braids) due to their high strength to weight ratio, there is a difficulty in designing this type of case due to the relatively brittle failure exhibited by most long fiber composites. As such, it is necessary to add significant thickness to a composite case as compared to a material which exhibits good ductility because the brittle failure of the long fibers of the composite material absorbs less energy compared to a ductile failure of a material with an equivalent ultimate stress allowable. Long fiber woven composites are highly anisotropic and the elongation at fracture differs significantly when stressed along the fiber direction vs when stressed at an angle to the fibers as illustrated in the graph of FIG. 2. This graph shows stress strain curves for various uniaxial loading directions in plain weave long fiber composite fabric. Although the peak stress drops significantly, the total energy absorbed through fracture actually increases as the loading angle increases as shown in the graph of FIG. 3. FIG. 3 shows normalized energy absorption at fracture. As can be seen, the energy absorption at break is significantly larger for fibers oriented at 45 degrees or higher with respect to each other. This dramatic increase in strain at break and the resulting increase in energy absorption is due to fiber trellising. Fiber trellising is the in-plane rotation of yarns to bring them into closer alignment to a stress vector.

At 45 degree loading, the proportional limit is hit early because the fibers are not highly loaded and the matrix cracks. As the strain increases, the failure of the matrix allows the fibers to come into alignment with the loading, thereby increasing the stress. This continues until failure occurs in the fibers, at which point the specimen breaks.

Figure 4:
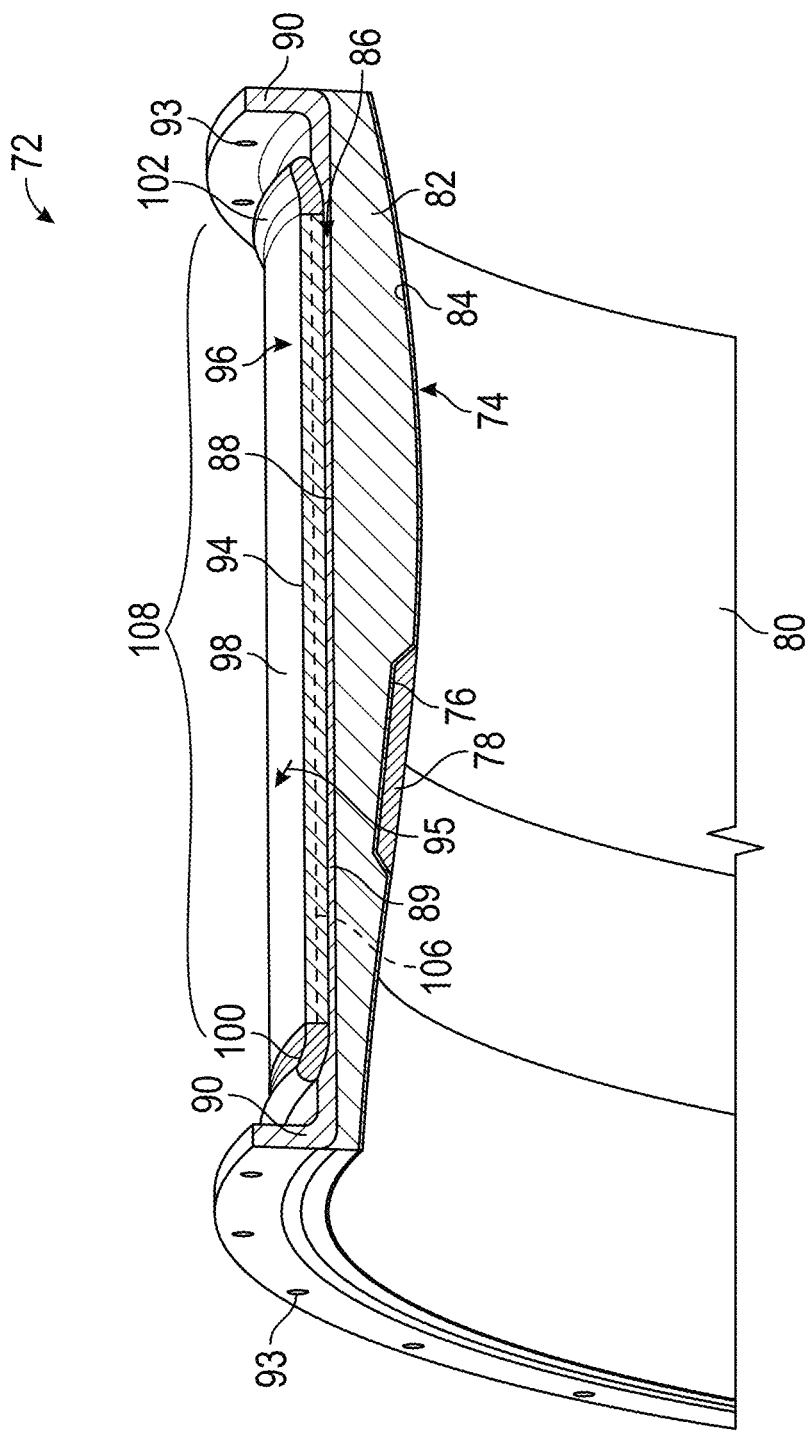
FIG. 4 is a partial perspective cross-sectional view of a fan case in accordance with the present disclosure.

FIG. 4 illustrates a portion of a case or casing 72 in accordance with the present disclosure. In one embodiment, the case or casing 72 is a fan case or casing 72 intended to retain fan blades 22 of the fan 12. It should be understood that while the case or casing 72 is illustrated as a fan case or casing the design of the case or casing 72 can be applied to other containment stages of the gas turbine engine (e.g., compressor section and turbine section).

As used herein forward or upstream and rearward or downstream refer are relative to the engine central longitudinal axis 26 and the direction gases flowing through the gas turbine engine 10. In addition, radially inward and radially outward also refer to the engine central longitudinal axis 26.

As used herein, "integral" or "integrally formed" is intended to cover a single unitary structure. In other words, the single unitary structure is not capable of being disassembled without cutting or destruction of the single unitary structure.

Figure 5:
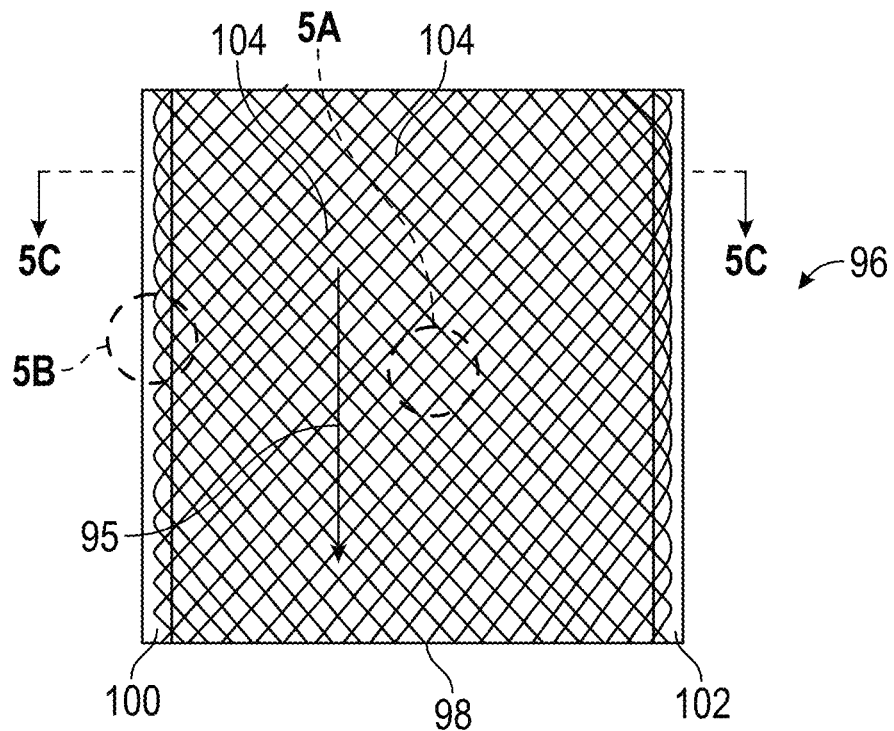
FIG. 5 is a view of a composite containment belt in accordance with the present disclosure.
Figure 5A:
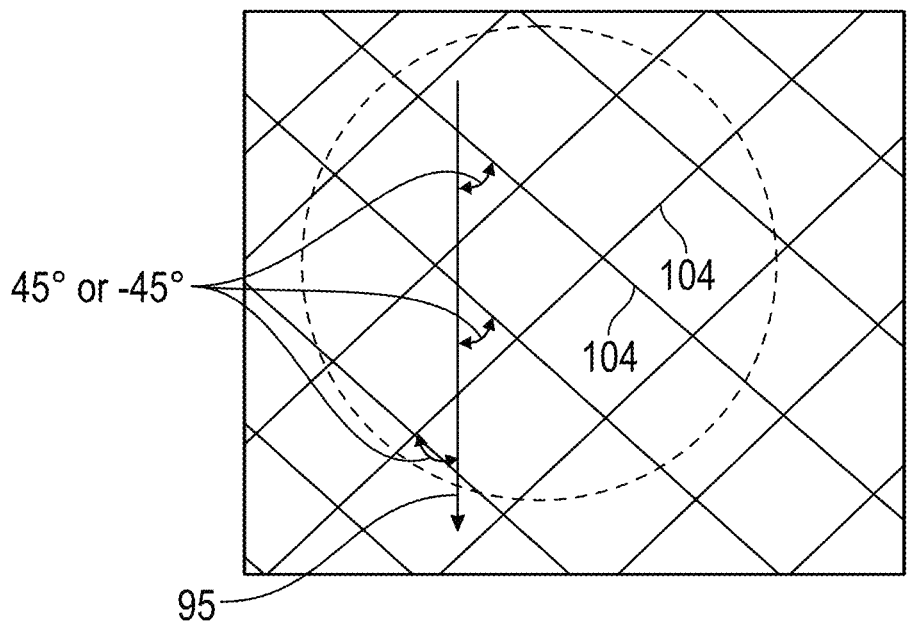
FIG. 5A is an enlarged view of a portion of FIG. 5.
Figure 5B:
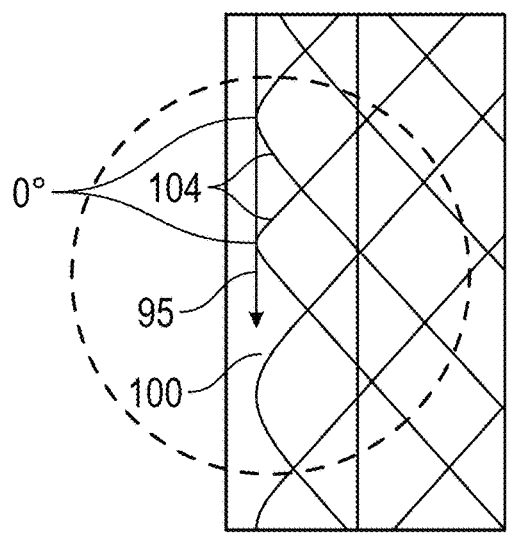
FIG. 5B is an enlarged view of a portion of FIG. 5.

As illustrated in at least FIGS. 4 and 5, the case or casing 72 includes an inner ring portion 74. In one non-limiting embodiment, the inner ring portion 74 may be formed from sheet metal or metal that is ductile. In another embodiment, the inner ring portion 74 may be formed a composite material. The inner ring portion 74 may be formed with a recessed area 76 for receipt of an abradable surface 78 such as a composite material. The abradable surface 78 being aligned with rotating blades 22 of the fan 12. The recessed area 76 and the abradable surface 78 are located on a radially inner surface 80 of the inner ring portion 74. Of course, embodiments of the present disclosure contemplate an inner ring portion 74 without the recessed area 76 and abradable surface 78. The inner ring portion 74 may also be configured to have perforations for acoustic purposes.

An intermediate layer of honeycomb and/or foam 82 is secured to a radially outward surface 84 of the inner ring portion 74. In one non-limiting embodiment, the intermediate layer of honeycomb is NOMEX honeycomb or aluminum single or double flex honeycomb or corrugated aluminum. As used herein, NOMEX honeycomb refers to a honeycomb core formed from NOMEX paper sheets that are coated and bonded together with a phenolic resin. NOMEX paper may be defined as sheets formed from a synthetic aromatic polyamide polymer or a synthetic textile fiber or equivalents thereof. (In one non-limiting embodiment, the intermediate layer of foam 82 is aluminum or polymer open or closed cell foam. An outer ring portion 86 is secured to a radially outward surface 88 of the layer of honeycomb and/or foam 82. The outer ring portion 86 may be formed from metal. The outer ring portion 86 includes a central portion 89 and a pair of flanges 90 that extend radially outward from a forward end and an aft end of the central portion 89 respectively. The flanges 90 may have openings 93 for bolts or fasteners (not shown) to pass therethrough in order to secure the outer ring portion 86 and the casing 72 to engine 20.

Secured to a radially outward surface 94 of the central portion 89 is a composite containment belt or ring 96. In one non-limiting embodiment, the composite material being anyone of glass, carbon, or aramid fiber reinforced epoxy or equivalents thereof. In one non-limiting embodiment, the composite containment belt or ring 96 is a radially outermost layer or ring of the casing 72. The composite containment belt or ring 96 includes a central portion 98 and an integrally formed forward ring portion 100 and an integrally formed an aft ring portion 102. As used herein, "integrally formed" is intended to cover a single unitary structure. In other words, the single unitary structure is not capable of being disassembled without cutting or destruction of the single unitary structure.

As mentioned above, the composite containment belt or ring 96 is formed from composite materials which include a plurality of continuous fibers 104 such that the composite containment belt is a fiber reinforced composite and the continuous fibers 104 extend continuously through the central portion 98, the forward ring portion 100 and the aft ring portion 102.

In order to form the composite containment belt or ring 96, a single elongated layer of a composite material 103 (FIG. 5D) is wrapped circumferentially about a radially outward surface of the outer ring portion 86 until the composite containment belt or ring 96 is formed from a plurality wrapped layers 105 of single elongated layer of a composite material or woven fabric 103 comprising the aforementioned continuous fibers 104. See also FIG. 5E which is a cross sectional view of the composite containment belt or ring 96 where the single elongated layer of a composite material 103 (FIG. 5D) is wrapped circumferentially about a radially outward surface of the outer ring portion 86 until the composite containment belt or ring 96 is formed from a plurality wrapped layers 105 of woven fabric 103 comprising the aforementioned continuous fibers 104. In one non-limiting embodiment, the fibers are formed from carbon fiber, glass fiber, or aramid fiber. In order to form the composite containment belt or ring 96 a resin is applied to the plurality of layers 105 of fabric. In one non-limiting embodiment, the resin is toughened epoxy or thermoplastic.

Figure 5C:
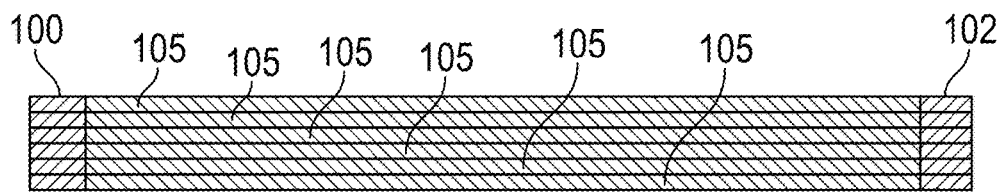
FIG. 5C is a view along lines 5C-5C of FIG. 5.
Figure 5D:
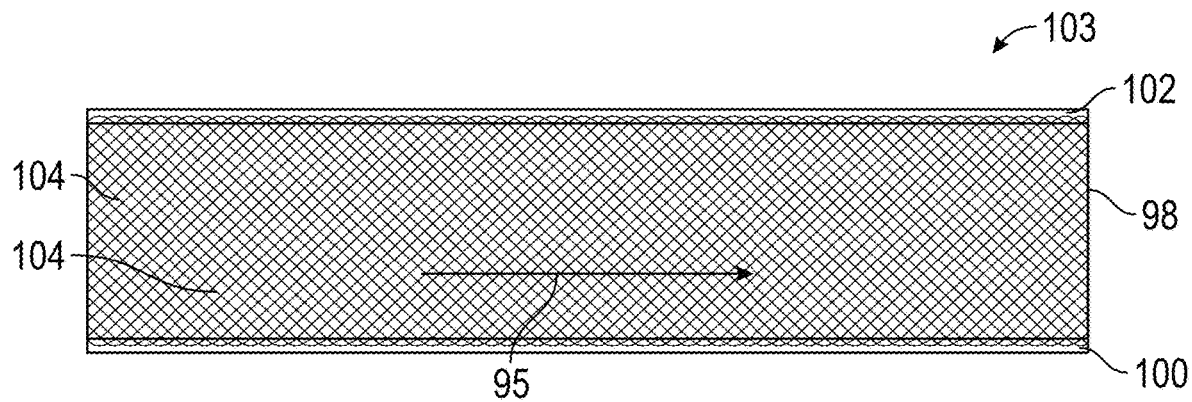
FIG. 5D a top view of a single elongated layer of a composite material in accordance with the present disclosure.
Figure 5E:
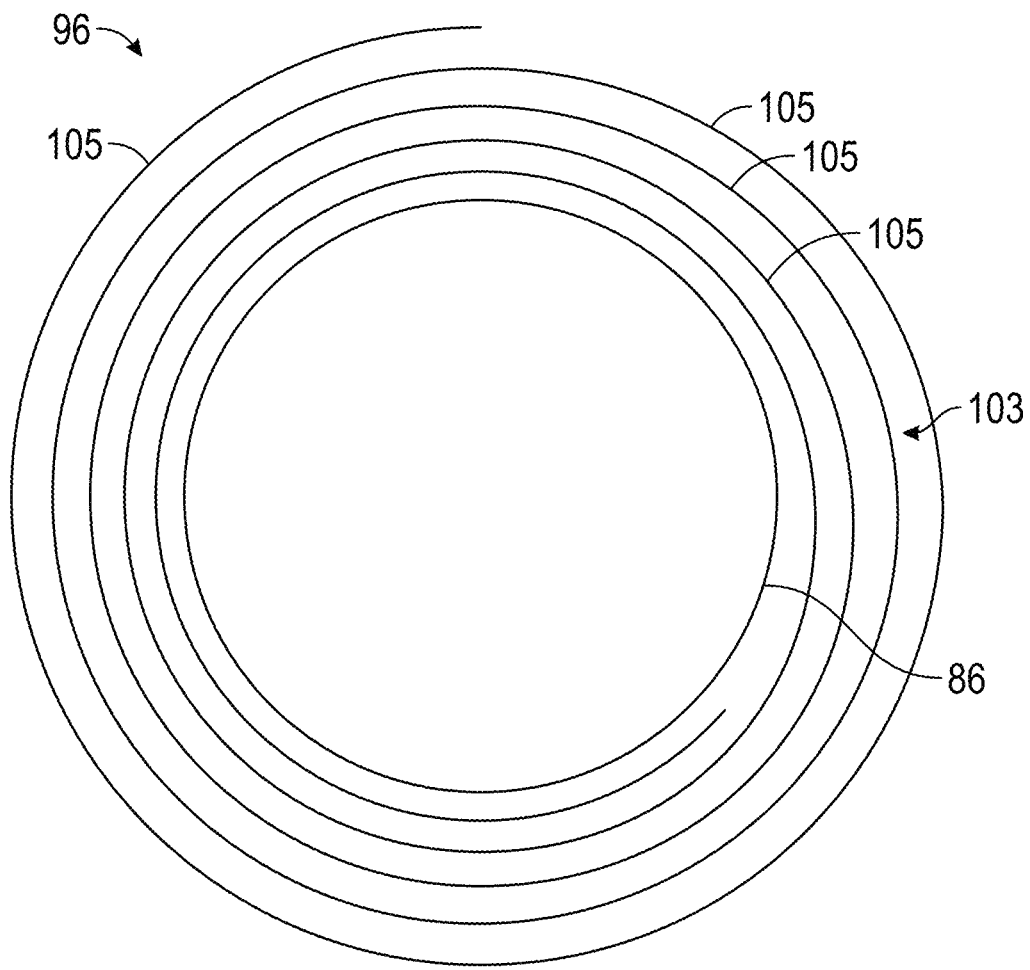
FIG. 5E is a cross sectional view of a composite containment belt or ring formed by the single elongated layer of FIG. 5D wrapped circumferentially about a radially outward surface of an outer ring portion of a casing and itself until a composite containment belt or ring is formed from a plurality wrapped layers of the single elongated layer of the composite material.

In accordance with the present disclosure and referring now to at least FIGS. 4-5C, the plurality of continuous fibers 104 located in each of the layers 105 of woven fabric of the central portion 98 of the composite containment belt or ring 96 are arranged at angle α such that they are absorb energy from a dislodged blade 22 prior to tensile fracture of the fibers 104. In one embodiment, the fibers 104 are arranged in a plane 106 that is tangential to a containment zone 108. As used herein, containment zone 108 is intended to refer to a circumferential area about the rotating blades 22 of the fan 12.

In one non-limiting embodiment, the plurality of continuous fibers 104 located in the layers of woven fabric of the central portion 98 of the composite containment belt or ring 96 are arranged at angle α of 45/−45 degrees or greater with respect to a hoop direction or circumferential direction 95 of the composite containment belt or ring 96. As used herein the hoop direction is intended to refer to the circumferential direction of the composite containment belt or ring 96.

By arranging the plurality of continuous fibers 104 to be at 45 degrees or greater with respect to the hoop direction or circumferential direction 95 of the composite containment belt or ring 96 of the composite containment belt or ring 96 the energy absorption capacity of the composite containment belt or ring 96 is increased by a factor approaching 3 times compared to a fabric layup where the plurality of continuous fibers 104 are at 0 degrees with respect to the hoop direction or circumferential direction 95 of the composite containment belt or ring 96. See for example the graphs of FIGS. 3 and 4.

In one non-limiting embodiment, the plurality of continuous fibers 104 of the composite containment belt or ring 96 is formed from a single layer, sheet or belt of plurality of continuous fibers 104 that is overlapped or wound about the outer ring portion 86, wherein the overlapping or winding of the single layer, belt or sheet locates the aforementioned angles at the forward ring portion 100 and the aft ring portion 102 and the central portion over each other. In other words, the single layer or belt or sheet of continuous fibers 104 (e.g., extending from a first end of the single belt or layer or sheet to an opposite end of the single belt or layer or sheet) is provided with the aforementioned angles between the fibers 104. Thereafter the single belt or layer or sheet is wound about the outer ring portion 86 and then subsequently wrapped upon itself to provide the multiple layers of the composite containment belt or ring 96.

Normally, a part layered up entirely in a single direction would be difficult to design and manufacture because the differing coefficients of thermal expansion between the fibers and matrix materials and matrix shrinkage during cure would cause the part to distort severely unless the layup is quasi-isotropic. However, a simple ring (e.g., the composite containment belt or ring 96) is a special case where these thermal mismatch and cure shrinkage stresses are reacted within the part, so a full layup of all 45 degree fabric is possible. Because impact occurs over a relatively large portion of the composite containment ring or belt 96 (often 60 or more degrees of the circumference of the composite containment ring or belt 96) it is preferable that the layup is done as a single piece wrap rather than using multiple pieces and using internal butt or lap joints.

The data of FIGS. 3 and 4 was derived from symmetric (equal fiber count in 0 and 90 deg directions) plain weave fabric.

In one non-limiting embodiment, it is desirable to have an area on either side of the containment zone 108 that is stiffer in the hoop direction to control the trajectory of a released blade that impacts the case 72 and prevent it from escaping the case 72 axially as well as limit deflections near the flanges 90 of the case 72. This can be achieved in one non-limiting embodiment by utilizing braiding or overlapping of the fibers 104 in the forward ring portion 100 and the aft ring portion 102 of the composite containment belt or ring 96 such that the plurality of continuous fibers 104 are at 0 degrees with respect to each other and aligned with the hoop direction of the composite containment ring or belt 96.

Accordingly, a continuous braded ring or belt 96 is woven such that the full width of the containment area 108 is a flat weave with tows at 45 and −45 degrees and at either edge 100 and 102 of the belt the tows would be turned back into the belt, skipping a few rows rather than turning at a tight 90 degrees and weaving back into the field portion in the next row.

The effect is a large field of 45/−45 degree fabric with borders of 0 degree fibers interwoven with the field. The 45/−45 degree field acts as a high toughness energy absorption device, while the borders act as deflection and trajectory limiting features.

The graphs of FIGS. 2 and 3 show that increased fiber angle to load application vector in a fabric is beneficial for energy absorption, with minimal change in ultimate tensile strength but large changes in elongation when going from 30 to 45 degrees. It is possible to increase these angles beyond 45 degrees when using braiding technology. In the simplest case, the braid would be created such that the tows in the field are a simple weave of 60/−60 degrees rather than 45.

In an alternative embodiment, the angle for a given weave of the containment belt is 65/−65 degrees.

In one embodiment, the composite containment ring or belt 96 is integrated into a full composite hard wall fan case 72 as shown in FIG. 4. The structure of the case would be cured with the composite containment ring or belt 96 as a single part in order to optimize the final properties. Other nonstructural portions of the case 72 can be cured separately and bonded in afterwards.

Figure 6:
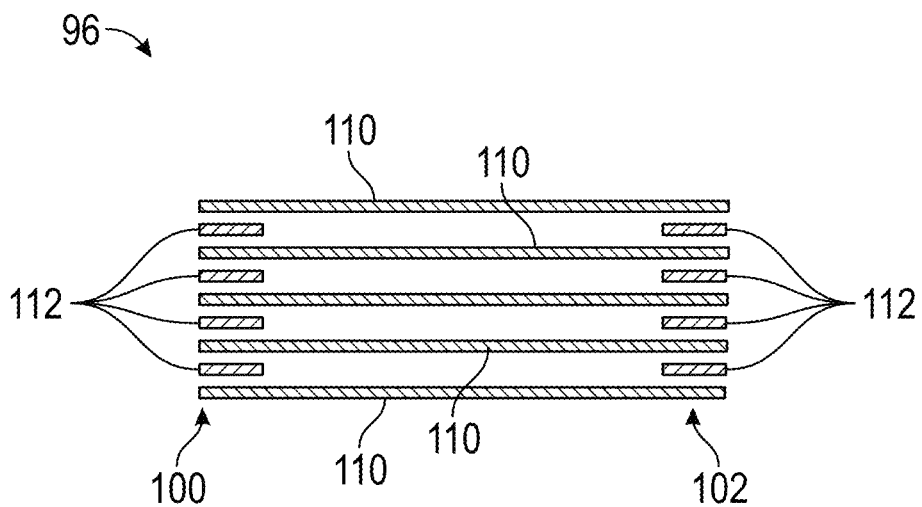
FIG. 6 is a cross-sectional view of a portion of a fan case in accordance with an alternative embodiment of the present disclosure.

In an alternative embodiment and referring now to FIG. 6, the composite containment ring or belt 96 can be provided with a high elongation zone 108 and additional hoop stiffness on the edges 100 and 102 may be achieved by using separate 45 degree fabric plies or layers 110 throughout the containment belt and at each edge 100, 102 by installing unidirectional tape plies 112 between the fabric layers 110. As such, the unidirectional tape plies 112 are not located between the fabric plies or layers 110 of the single belt wound about the outer ring portion 86. For example, as the belt is wound about the outer ring portion 86 and then back upon itself the unidirectional tape plies 112 are located in the fore and aft areas or edges 100 and 102 and they are not located in the central portion corresponding to the high elongation zone 108 of the composite containment ring or belt 96. In one non-limiting embodiment, the composite containment ring or belt 96 may be laid up and cured on top of the outer ring portion 86.

In yet another embodiment, the composite containment ring or belt 96 may be cured in such a way that it is effectively mechanically decoupled from the rest of the case 72 under high loads. This may be accomplished with any one of a TEFLON layer, an intentionally weak adhesive layer, or a weak foam or honeycomb layer located between the composite containment ring or belt 96 and the structure of the case 72.

Figure 7:
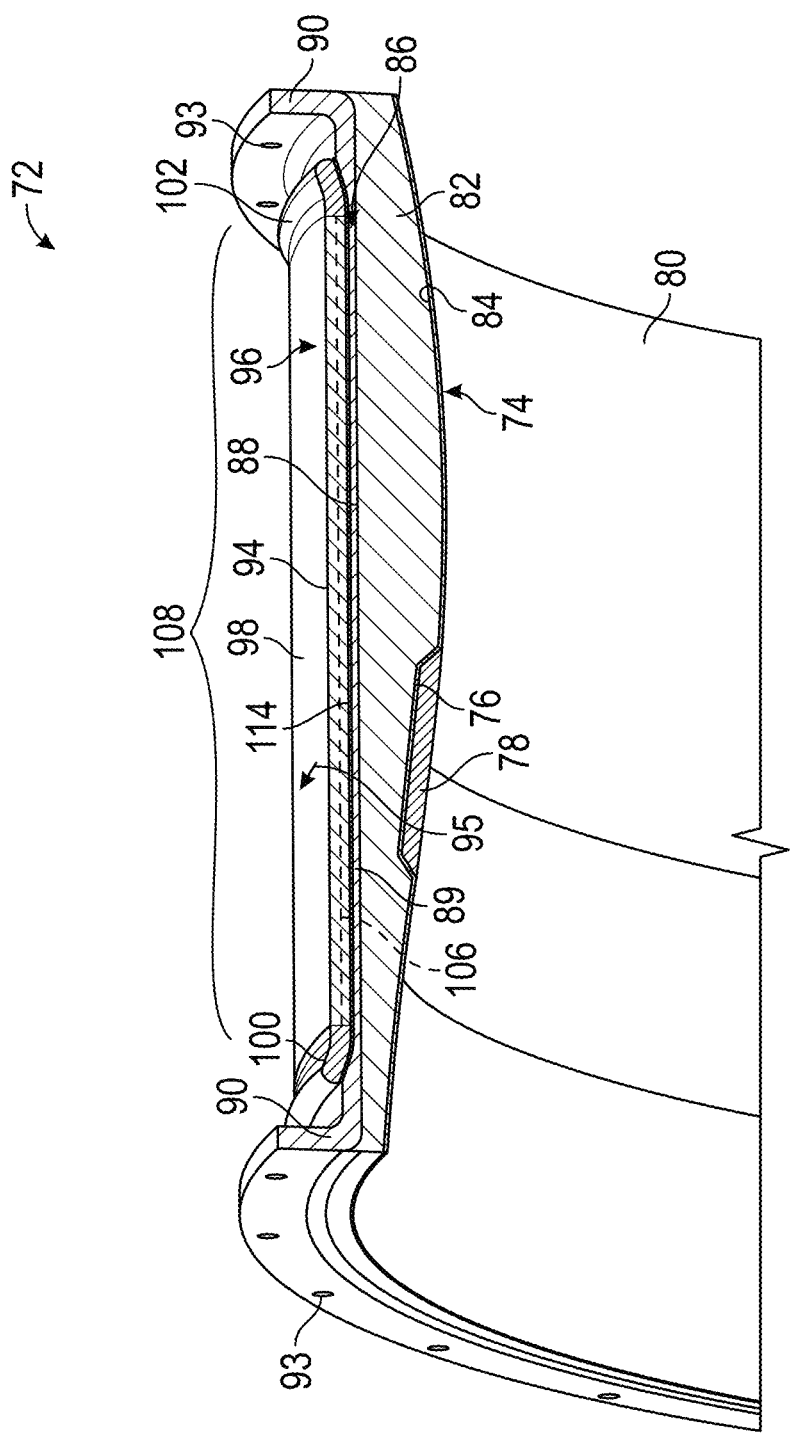
FIG. 7 is a partial perspective cross-sectional view of a fan case in accordance with an alternative embodiment of the present disclosure.
Figure 8A:
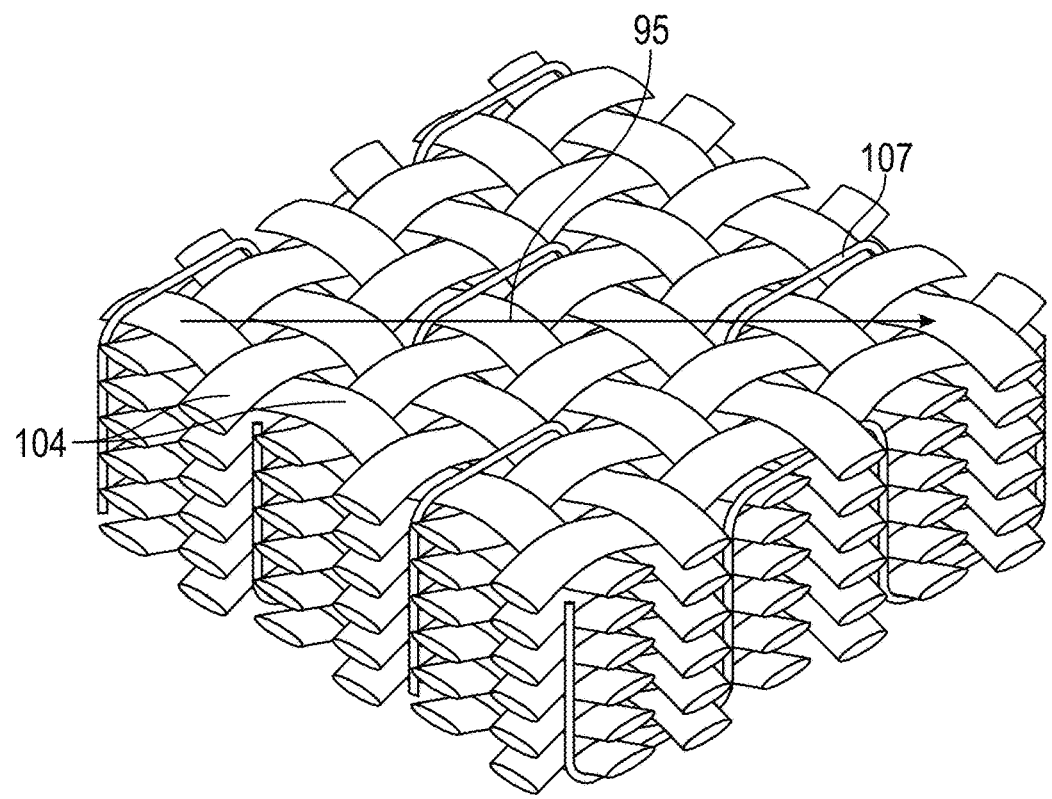
FIGS. 8A-11C illustrate alternative configurations of portions of the composite containment belt in accordance with the present disclosure.
Figure 8B:
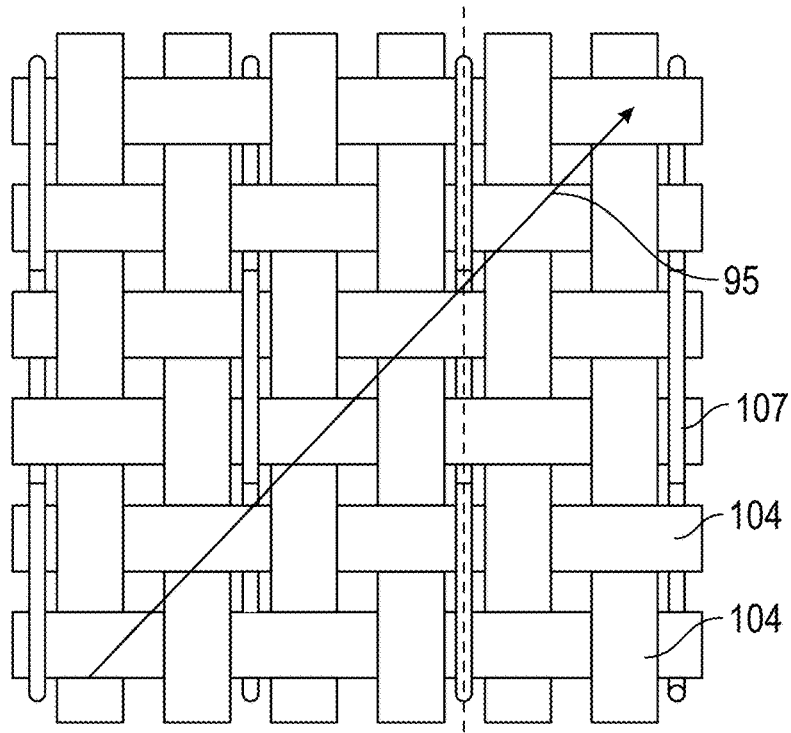
Figure 8C:
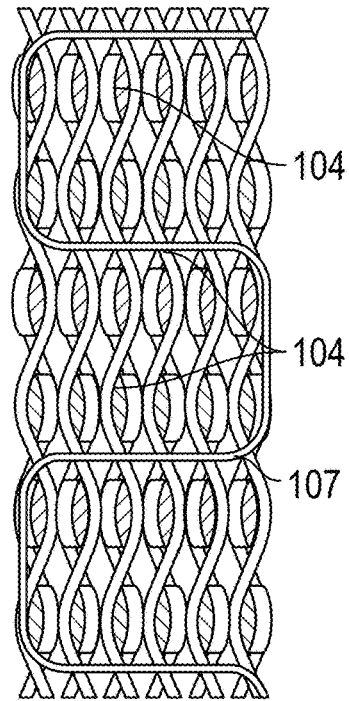
Figure 9A:
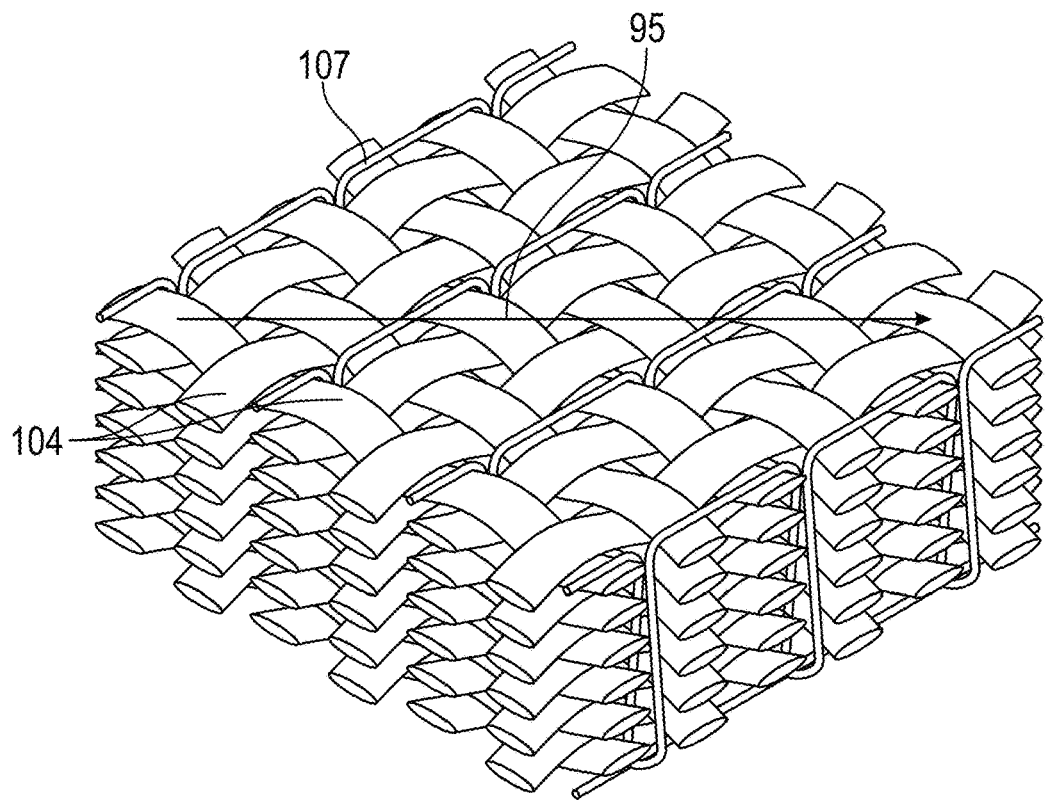
Figure 9B:
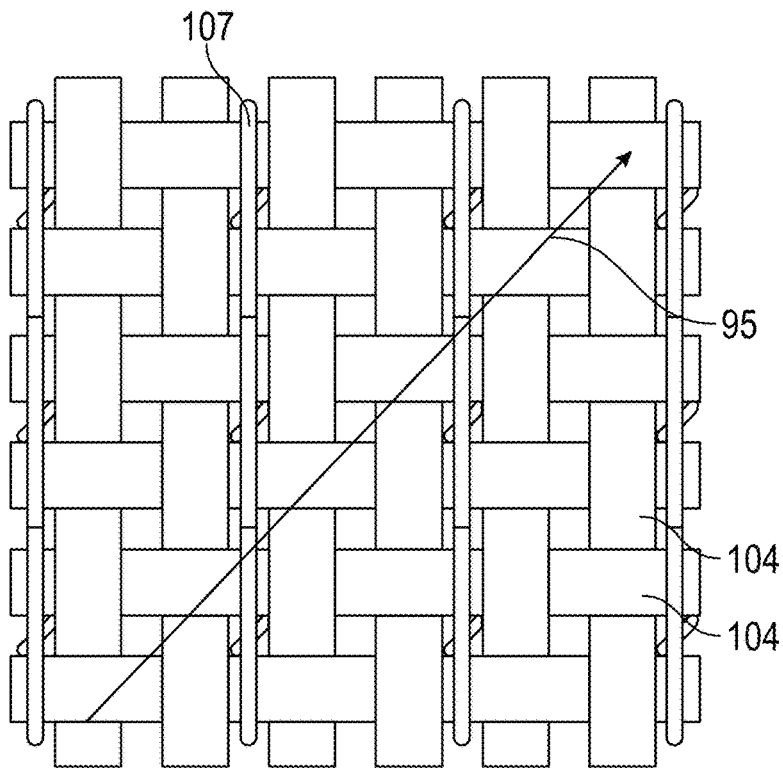
Figure 9C:
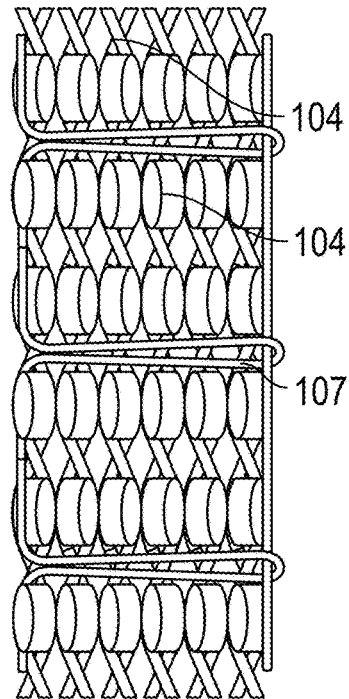
Figure 10A:
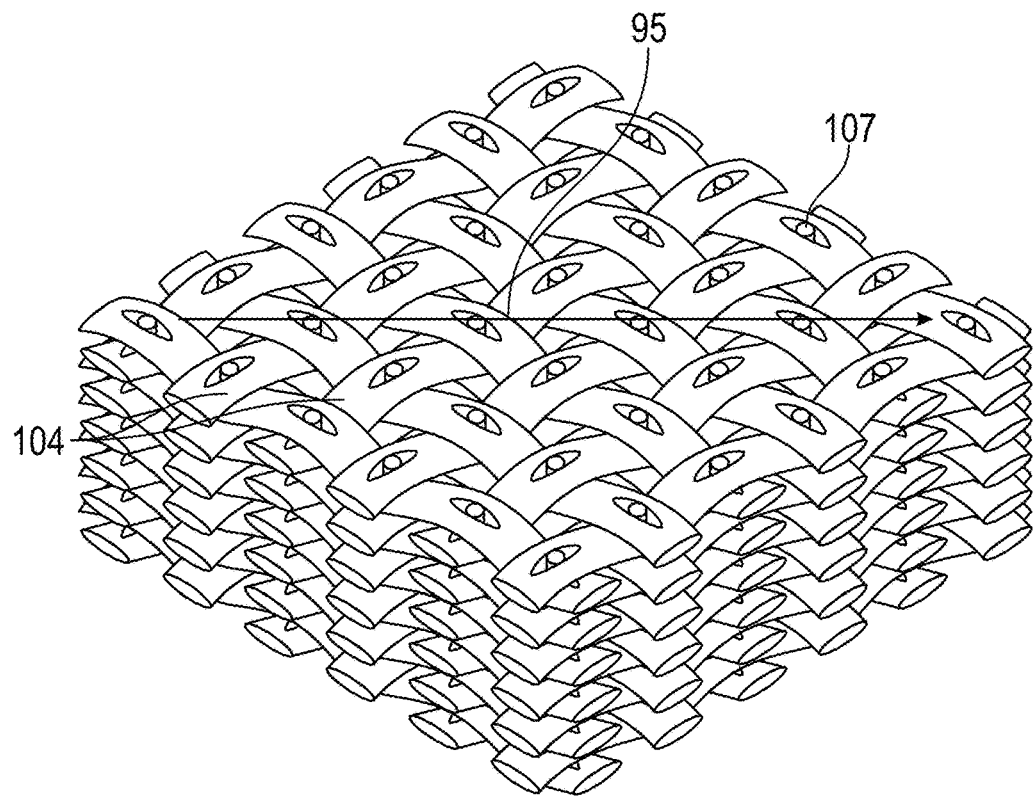
Figure 10B:
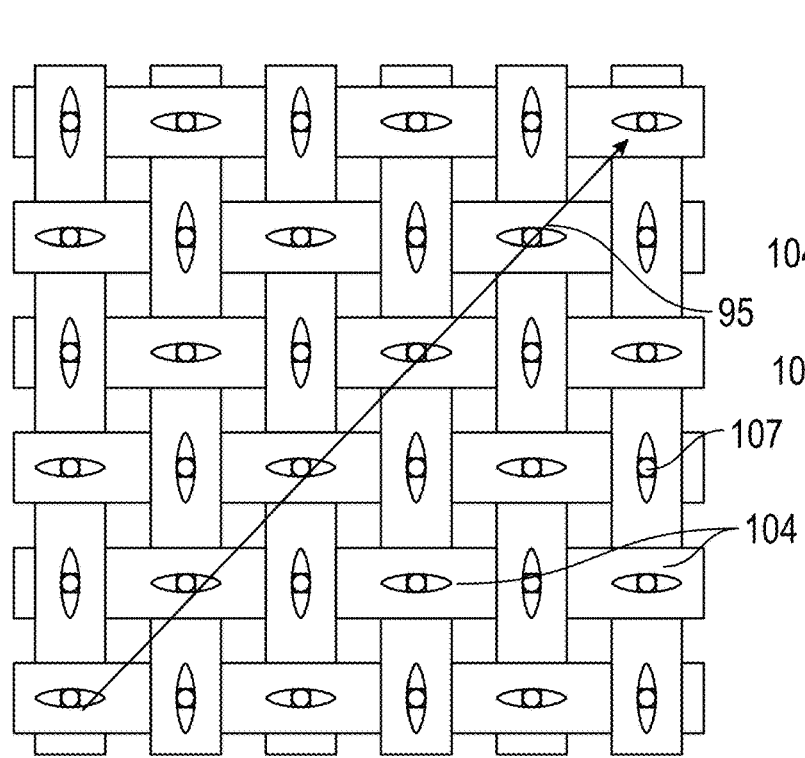
Figure 10C:
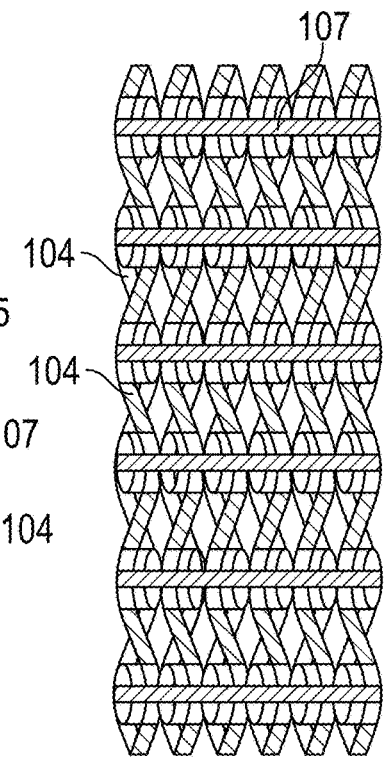

In yet another alternative embodiment and referring now to FIG. 7 an in order to mechanically decouple the composite containment ring or belt 96 from the central portion 89 and the pair of flanges 90 of the outer ring portion 86, a layer of weak crushable foam or honeycomb 114 is located between the composite containment belt or ring 96 and the outer ring portion 86 of the case 72 that decouples and absorbs energy during a fan blade off (FBO). In yet another alternative, the composite containment ring or belt 96 is releasably bonded to the outer ring portion 86 of the case 72 or layer of weak crushable foam or honeycomb 114 such that the composite containment ring or belt 96 is released or decoupled from the outer ring portion 86 of the case 72 or layer of weak crushable foam or honeycomb 114 during a fan blade off (FBO).

In yet another embodiment, fabric of the composite containment ring or belt 96 is configured such that a radially inner layer or the first several inners layers of the fabric is/are installed with the inner ply fabric tows at 45 degrees, and then increasing the angle for later applied radially outer layers. In this embodiment, the inner layers stretch to their ultimate stress before radially outer layers fail. In this embodiment, the first portion of the belt wound about the outer ring portion 86 will have the fabric tows at 45 degrees and then gradually change to greater angles as the belt is wound upon itself about the outer ring portion 86.

In yet another alternative embodiment, the composite containment belt or ring 96 can be configured with a plurality of fabric layers that alternate continuously with fibers 104 arranged between 45 degrees and 60+degrees. This would cause interlaminar shear to accumulate due to the differing trellising behaviors, thus absorbing additional energy in interlaminar shear strain. Again, the belt being wrapped about the outer ring portion 86 would fibers 104 arranged at varying angles with respect to each along the length of the belt as it is wound about the outer ring portion and upon itself.

In an alternative embodiment, some of the fibers 104 can be oriented in the through-thickness direction using more complex braiding techniques or 3D weaves as long as the aforementioned beneficial trellising phenomenon is not adversely affected.

For example and referring now to FIGS. 8A-10C some of the fibers 104 are arrange at the aforementioned angles with respect to each other in the single belt before it is wrapped around the outer ring portion 86 and then upon itself. Thereafter and after the ring 96 is formed a fiber 107 is extended through each of the wound layers of the single belt. In one embodiment, these fibers 107 extend between gaps between fibers 104. See FIGS. 8A-9C. Alternatively, these fibers 107 pass through fibers 104. See FIGS. 10A-10C. In one embodiment, the fibers 107 are stitched (FIGS. 9A-9C). In yet another embodiment, the fibers 107 are woven in FIGS. 8A-8C. In this embodiment, the ring 96 would have to be woven into the desired ring 96 as opposed to a single belt wrapped about the outer ring portion 86 and itself and thereafter the fibers 107 are stitched in (see at least FIGS. 8A-8C).

Figure 11A:
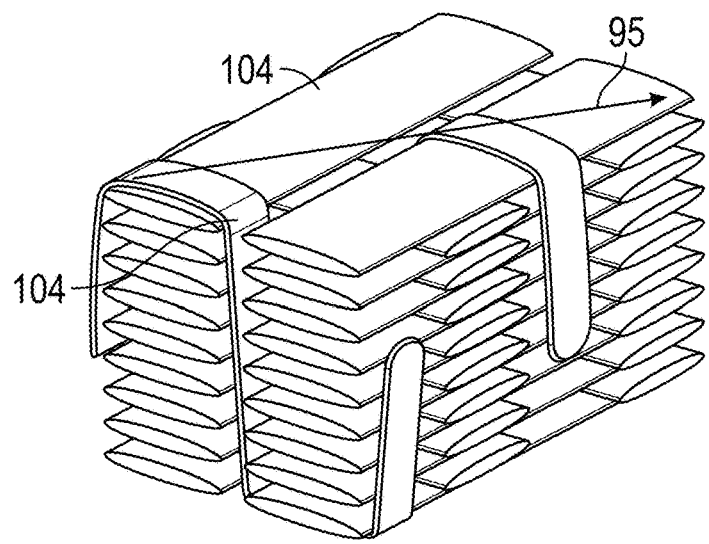
Figure 11B:
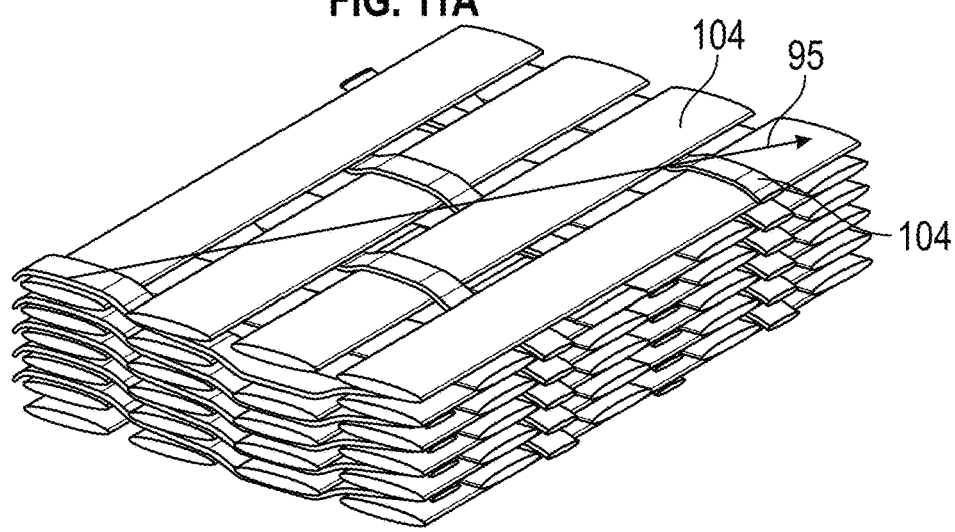
Figure 11C:
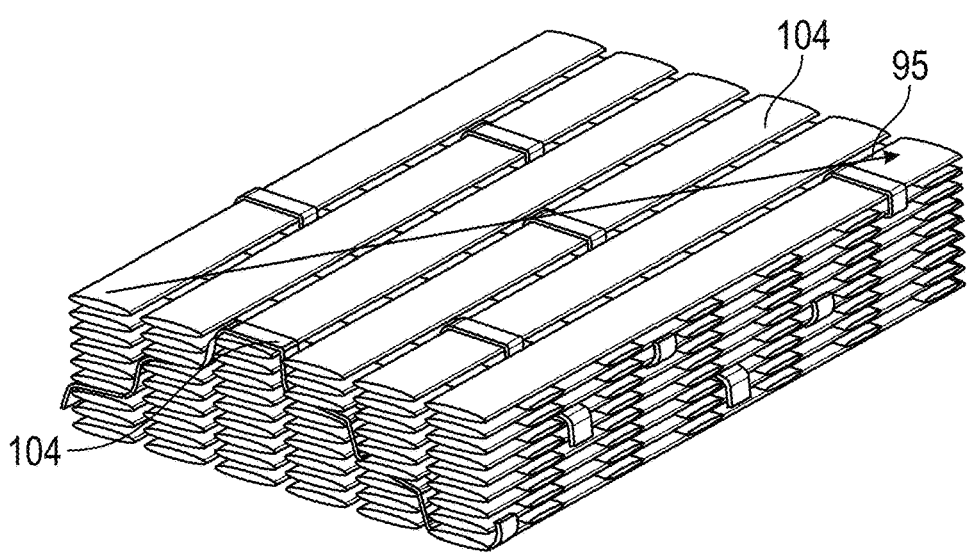

Referring now to FIGS. 11A-11C, an alternative embodiment is illustrated wherein the fibers 104 are woven in a 3D weave. In this embodiment, the ring 96 would have to be woven into the desired ring 96 as opposed to a single belt wrapped about the outer ring portion 86 and itself.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A casing for a gas turbine engine, comprising:
   an inner ring portion;
   an intermediate layer of honeycomb and/or foam secured to a radially outward surface of the inner ring portion;
   an outer ring portion secured to a radially outward surface of the layer of honeycomb and/or foam; and
   a composite containment belt secured to a radially outward surface of the outer ring portion, the composite containment belt having a central portion integrally formed with a forward ring portion and an aft ring portion, the composite containment belt formed from at least one single woven belt wound about the outer ring portion, the at least one single woven belt including a plurality of continuous fibers, wherein a first portion of the plurality of continuous fibers are at arranged at an angle of 45/−45 degrees or greater with respect to a circumferential direction of the composite containment belt in the central portion and a second portion of the plurality of continuous fibers are at arranged at an angle of less than 45/−45 degrees with respect to the circumferential direction of the composite containment belt in the forward ring portion and the aft ring portion.

2. The casing as in claim 1, wherein the first portion of the plurality of continuous fibers are at arranged at an angle of 45/−45 degrees with respect to the circumferential direction in the central portion of the composite containment belt and the second portion of plurality of continuous fibers are arranged at an angle of 0 degrees with respect to the circumferential direction in the forward ring portion and the aft ring portion.

3. The casing as in claim 1, wherein the second portion of the plurality of continuous fibers are arranged at an angle of 0 degrees with respect to the circumferential direction in the forward ring portion and the aft ring portion.

4. The casing as in claim 1, wherein the intermediate layer is a layer of honeycomb and the inner ring portion is formed from a composite material.

5. The casing as in claim 1, wherein the intermediate layer is a layer of foam and the inner ring portion is formed from a composite material.

6. The casing as in claim 1, wherein the intermediate layer is a layer of honeycomb and foam and the inner ring portion is formed from a composite material and the outer ring portion is formed from anyone of the following; sheet metal formed from one of steel, aluminum, and titanium or a composite material of glass, carbon, or aramid fiber reenforced epoxy and the inner ring portion is formed from anyone of the following sheet metal formed from one of steel, aluminum, and titanium or a composite material of glass, carbon, or aramid fiber reenforced epoxy.

7. The casing as in claim 1, further comprising a pair of flanges extending radially outward from the inner ring portion.

8. The casing as in claim 1, wherein the inner ring portion further comprises a recessed area for receipt of an abradable surface therein.

9. A gas turbine engine, comprising:
a fan having a plurality of fan blades;
a casing surrounding the plurality of fan blades, the casing comprising:
an inner ring portion;
an intermediate layer of honeycomb and/or foam secured to a radially outward surface of the inner ring portion;
an outer ring portion secured to a radially outward surface of the intermediate layer of honeycomb and/or foam; and
a composite containment belt secured to a radially outward surface of the outer ring portion, the composite containment belt having a central portion integrally formed with a forward ring portion and an aft ring portion, the composite containment belt formed from at least one single woven belt wound about the outer ring portion, the at least one single woven belt including a plurality of continuous fibers arranged with respect to each other, wherein a first portion of the plurality of continuous fibers are at arranged at an angle of 45/−45 degrees or greater with respect to a circumferential direction of the composite containment belt in the central portion and a second portion of the plurality of continuous fibers are at arranged at an angle of less than 45/−45 degrees with respect to the circumferential direction of the composite containment belt in the forward ring portion and the aft ring portion.

10. The gas turbine engine as in claim 9, wherein the first portion of the plurality of continuous fibers are at arranged at an angle of 45/−45 degrees with respect to the circumferential direction in the central portion of the composite containment belt and the second portion of the plurality of continuous fibers are arranged at an angle of 0 degrees with respect to the circumferential direction in the forward ring portion and the aft ring portion.

11. The gas turbine engine as in claim 9, wherein the second portion of the plurality of continuous fibers are arranged at an angle of 0 degrees with respect to the circumferential direction in the forward ring portion and the aft ring portion.

12. The gas turbine engine as in claim 9, wherein the intermediate layer is a layer of honeycomb and the inner ring portion is formed from a composite material.

13. The gas turbine engine as in claim 9, wherein the intermediate layer is a layer of foam and the inner ring portion is formed from a composite material.

14. The gas turbine engine as in claim 9, wherein the intermediate layer is a layer of honeycomb and foam and the outer ring portion is formed from anyone of the following; sheet metal formed from one of steel, aluminum, and titanium or a composite material of glass, carbon, or aramid fiber reenforced epoxy and the inner ring portion is formed from anyone of the following sheet metal formed from one of steel, aluminum, and titanium or a composite material of glass, carbon, or aramid fiber reenforced epoxy.

15. The gas turbine engine as in claim 9, further comprising a pair of flanges extending radially outward from the outer ring portion.

16. The gas turbine engine as in claim 9, wherein the inner ring portion further comprises a recessed area for receipt of an abradable surface therein.

17. The gas turbine engine as in claim 9, wherein the composite containment belt is formed from a single overlapping layer of a plurality of continuous fibers.

18. The gas turbine engine as in claim 9, wherein a layer of foam or honeycomb is located between the composite containment belt and the outer ring portion.

19. The gas turbine engine as in claim 12, wherein the intermediate layer is a layer of honeycomb or foam and the inner ring portion is formed from a composite material.

20. A casing for a gas turbine engine, comprising:
an inner ring portion;
an intermediate layer of honeycomb and/or foam secured to a radially outward surface of the inner ring portion;
an outer ring portion secured to a radially outward surface of the layer of honeycomb and/or foam; and
a composite containment belt secured to a radially outward surface of the outer ring portion, the composite containment belt being formed from a plurality of 45 degree fabric plies or layers overlaying each other at a central portion of the composite containment belt and wherein unidirectional tape plies are located between the plurality of separate 45 degree fabric plies at a forward ring portion and an aft ring portion each integrally formed with the central portion of the composite containment belt wherein the unidirectional tape plies are not located between the plurality of separate 45 degree fabric plies at the central portion of the composite containment belt.

* * * * *